United States Patent [19]

Hudson et al.

[11] 4,044,095

[45] Aug. 23, 1977

[54] PROCESS FOR RECOVERY OF ALUMINA FROM HIGH-SILICA ORE

[75] Inventors: Lawrence Keith Hudson, Oakmont, Pa.; Kenneth I. Savage, Downers Grove; John M. Stinson, Jr., Belleville, both of Ill.

[73] Assignee: Aluminum Company of America, Pittsburgh, Pa.

[21] Appl. No.: 623,931

[22] Filed: Oct. 20, 1975

[51] Int. Cl.² ............................. C01F 7/06; C01F 7/04
[52] U.S. Cl. ..................................... 423/127; 423/119; 423/111; 423/131
[58] Field of Search ............... 423/119, 131, 121, 127, 423/111

[56] References Cited

U.S. PATENT DOCUMENTS

| | | | |
|---|---|---|---|
| 1,747,759 | 2/1930 | Done et al. | 423/121 |
| 2,244,194 | 6/1941 | Haglund | 423/131 |
| 2,559,653 | 7/1951 | Mooney | 423/121 |
| 3,198,622 | 8/1965 | Herzog et al. | 423/119 |
| 3,241,910 | 3/1966 | Johnson | 423/119 |

FOREIGN PATENT DOCUMENTS

| | | | |
|---|---|---|---|
| 139,315 | 10/1960 | U.S.S.R. | 423/119 |
| 108,917 | 3/1954 | U.S.S.R. | |

OTHER PUBLICATIONS

Maslenitiski et al., "Izd. Metalurgiya", Chap. I, Moscow, 1969.
Ponomarev et al., "Tavetnye Metally", 1957, pp. 45-51.
Ponomarev et al., "Report of Higher Educational Institutions, Nonferrous Metallurgy", No. 2, 1958, pp. 93-100.

*Primary Examiner*—Herbert T. Carter
*Attorney, Agent, or Firm*—John P. Taylor

[57] ABSTRACT

Back reactions of dissolved alumina from a high caustic-lime digest of anorthosite and other alumina-containing siliceous materials can be eliminated or mitigated by control of particle size of digestible material; and time and temperature of separation of the alumina-bearing liquid from the solid residues. In one embodiment the back reaction is further controlled by adjustment of the caustic concentration of the digest effluent.

8 Claims, 2 Drawing Figures

PROCESS FOR RECOVERY OF ALUMINA FROM HIGH-SILICA ORE

CROSS-REFERENCE TO RELATED APPLICATION

This application is related to an application entitled "Improved Recovery of Sodium Aluminate from High-Silica Aluminous Materials" Ser. No. 623,930 filed concurrently on October 20, 1975 in the names of Lawrence Keith Hudson and Thomas G. Swansiger, now U.S. Pat. No. 3,998,927.

BACKGROUND OF THE INVENTION

1. Field of the Invention

The invention relates to extraction of alumina from aluminous material of high-silica content. More particularly, it relates to improving the yield of alumina in a caustic-lime digestion of anorthosite and like alumina-bearing siliceous materials.

2. Description of the Prior Art

Caustic-lime digestion of aluminous material of high-silica content such as anorthosite and other ores, shale, clay, Bayer red mud, and the like, is disclosed by Ponomarev and Sazhin on pages 45–51 of a 1957 article entitled "The Hydro Chemical Alkali Method of Processing Nepheline Rocks" in TEVETNYE METALLY; on pages 93–100 of their 1958 article entitled "Leaching of Alumina from Nephelines by Alkaline Solutions in the Presence of Lime" in report of Higher Educational Institutions, Nonferrous Metallurgy; and in their Russian Pat. No. 108,917; as well as I. N. Maslenitiski et al in Autoclave Processes in Non-Ferrous Metallurgy (Chapter I), Izd. Metalurgiya Moscow, 1969.

The process described in these publications involves a high pressure, high temperature digest of nepheline, an alumina-bearing siliceous ore, in caustic using lime to form a digest slurry containing dissolved sodium aluminate and an insoluble sodium-calcium silicate-residue.

It is stated by Ponomarev et al in their 1958 publication that the autoclave containing the digest is cooled to 80°–100° C and the precipitate quickly separated. However, it has been found that, upon reduction of the digest slurry to atmospheric pressure and thereby lowering of the temperatures to atmospheric boiling point (to provide practical temperature and pressure conditions for separation of the dissolved alumina from the residue) a back reaction occurs wherein the alumina in solution reacts with the residue to form a compound having an x-ray diffraction pattern very similar to that of the original ore — at least when anorthosite is used. These reactions can be expressed (in the following unbalanced equation) as:

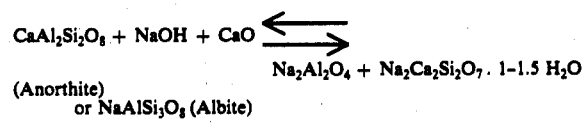

Furthermore, it has been discovered that this back reaction surprisingly is favored with reduction of temperature to a maximum reaction rate which occurs at about 100° C at which point as much as 50% of the dissolved alumina may back react with the residue if the residue and solution remain in contact with one another for an hour.

Still further, it has been found that the rate of the back reaction is dependent upon the particle size of the material to be digested as well as the concentration of the digest slurry.

There seems to be little, if any, appreciation of the problem of back reaction in the foregoing Russian publications. While Ponomarev et al 1957 appears to suggest that the slurry should be diluted or washed with water, this may have been merely for recovery of soluble values from the residue. Dilution can create other problems with regard to subsequent evaporation of the added water. The Maslenitiski et al article on page 42 of the translation, even suggests that size of the material to be digested has little effect on the yield of alumina because of the high velocity of the nepheline decomposition.

An alumina extraction or separation method has now been developed which prevents much of such loss of alumina by back reactions.

SUMMARY OF THE INVENTION

In its broader aspects the invention involves reduction of the back reaction by control of the size of the particles of the material initially digested and providing a rapid and preferably high temperature separation. The effective blending of these parameters can result in a separation yielding up to 95% of the alumina initially solubilized in the digest, i.e. the problem of back reactions is essentially eliminated. In one embodiment, the caustic concentration of the digest effluent is lowered to reduce the back reaction rate.

In accordance with the invention, the material to be digested is ground to provide a particle size distribution range of at least about 80% by weight from about −35 mesh to about +325 mesh (Tyler), and preferably from about −65 mesh to about +325 mesh; and the alumina-bearing liquid is separated from the insoluble residue at a temperature of at least about 120° C in as short a period of time as possible and in no event more than about 60 minutes. In an alternate embodiment, the separation is carried out at a temperature of not greater than 80° C. In one embodiment, the effluent from the digest is diluted prior to separation with a stream having a lower soda content than that of the effluent but preferably a high alumina to soda ratio.

DESCRIPTION OF THE DRAWINGS

For a better understanding of the invention, reference will now be made to the drawings which form a part hereof.

DESCRIPTION OF THE INVENTION

As previously stated, this invention relates to the elimination or mitigation of back reactions of dissolved alumina obtained by the digest of highly siliceous alumina-bearing materials in a high caustic concentration-lime digest. Before discussing the specific aspects of the invention, it may be helpful to review, in general, the overall process to which the invention relates.

Figure 1:
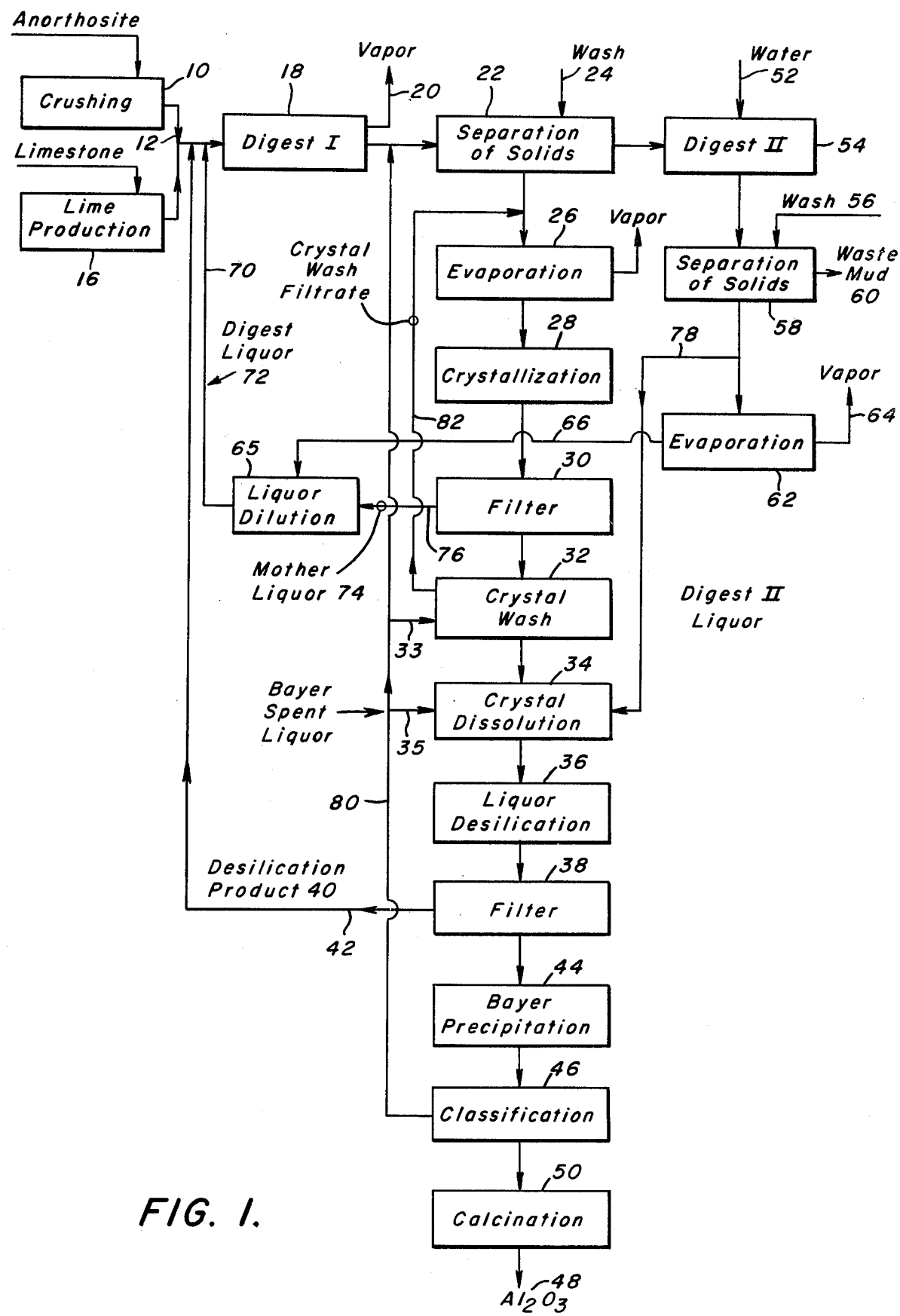
FIG. 1 is a schematic representation in flowsheet form of an overall process whereby alumina is produced from aluminous materials of high-silica content by employing the particle size control; quick residue separation techniques; and liquor recycling embodiments of the present invention.

Referring now to FIG. 1 an alumina-bearing siliceous material such as anorthosite, after size reduction at 10, is mixed at 12 with lime produced from limestone at 14, prior to caustic digestion at 18 (Digest I). Caustic is introduced into Digest I as digest liquor 72 which comprises recycled caustic entering the digest via line 70 as will be described below. Heat exchange equipment is not shown on this schematic flow diagram but vapors withdrawn from the solution leaving Digest I are carried via line 20 to heat the slurry coming to Digest I. Solids separated at 22 are washed at 24, the resulting solution being evaporated at 26 and hydrated sodium aluminate crystallized from it at 28 prior to filtering at 30, washing at 32 and dissolving of crystals at 34. The resulting liquor is next desilicated at 36 prior to being filtered at 38, with a desilication product 40 being returned to Digest I via line 42. Alumina hydrate is then precipitated at 44 from the aluminate solution, using Bayer precipitation techniques, prior to being classified at 46 and then calcined to alumina ($Al_2O_3$) at 50.

Solids separated at 22 are digested with water in a second digest at 54 (Digest II), with separation of solids at 58 to provide a clarified caustic solution and waste mud 60. The clarified caustic solution may then be evaporated at 62, with vapor being removed via line 64 and the resulting caustic-rich liquor being conducted via line 66 to a liquor dilution step 65, from which it is recycled via line 70 as digest liquor 72 to the first digestion step 18. Mother liquor 74 from filter step 30 is also introduced via line 76 for liquor dilution at 65. Part of the liquor from separation of solids at 58 may be conducted via line 78 for crystal dissolution step 34. Portions of Bayer spent liquor recycled from classification step 46 via line 80 for use in separation of solids at 22 are introduced to crystal dissolution step 34 and crystal wash step 32. Liquor from crystal wash step 32 is recycled via line 82 and reintroduced to the system prior to evaporation step 26.

Now referring more specifically to the invention, the particle size range for the alumina-containing siliceous material to be digested is at least about 80% by weight, from about −35 mesh, and preferably from about −65 mesh, to about +325 mesh (Tyler).

The use of particles of about −35 mesh or smaller provides particles small enough to permit recovery of the alumina from the material while the lower limit of +325 mesh is provided because of the enhanced tendency for finer particles to enter into back reactions — perhaps due to their larger surface areas. The use of such larger size particles provides additional benefits by reducing grinding expense and permitting easier separation of the residue after digestion.

The effectiveness of using such coarser particles of ground ore is reducing the undesirable back reaction between dissolved alumina and residue in the Digest I effluent and thus increasing the yield is quite surprising. The reduced surface area and consequent reduced contact area between such coarser particles entering the digester and the caustic would have been expected to reduce the yield of alumina rather than to have increased the yield. Apparently, however, the use of larger size particles as digest feed within the range specified, results in a residue of reduced surface area thereby serving to inhibit the back reaction between the residue and the dissolved alumina. In fact, when several digests were run using various size particles within the desired range as well as particles smaller than 325 mesh, analysis of the yield (after digest) showed that in the digest using particles smaller than 325 mesh a lower yield of alumina resulted.

While we do not wish to be bound by any particular theory, it appears that the back reaction which our invention tends to lessen apparently involves the recombination of aluminum oxide with sodium and silicon and calcium of the sodium-calcium-silicate insoluble residue to form compounds similar to the initial starting materials as previously discussed. X-ray diffraction analyses have also indicated the presence of other compounds such as, for example, a sodalite ($Na_8Al_6Si_6O_{25}$) and/or a hydrogarnet ($Ca_6Al_4Si_3O_{18}\cdot 6H_2O$). At above 200° C the slurry is relatively stable, with little if any, back reaction. However, as the digested slurry begins to cool, this reaction rate increases with the highest losses of alumina tending to occur at about 100° C.

Since the digest is carried out under high pressure conditions, economics and equipment availability dictate that it should be reduced to atmospheric pressure to affect the separation of the dissolved alumina from the insoluble residue. The resultant cooling to a temperature approximating the atmospheric boiling point of the effluent, for example, about 140° C, results in a temperature condition favoring the back reaction previously discussed. For example, when the dissolved alumina remains in contact with the residue for an hour (after initial cooling below 200+° C) as much as 50% of the alumina can be lost if the temperature approaches 100° C.

Thus, in accordance with the invention, we separate the dissolved alumina from the residue at a temperature of at least 120° C and preferably at as high a temperature above that point as is practically feasible. Usually this can be as high as the atmospheric boiling point of the effluent, i.e. about 140° C although even higher temperatures can be employed if separation under pressure is feasible.

Figure 2:
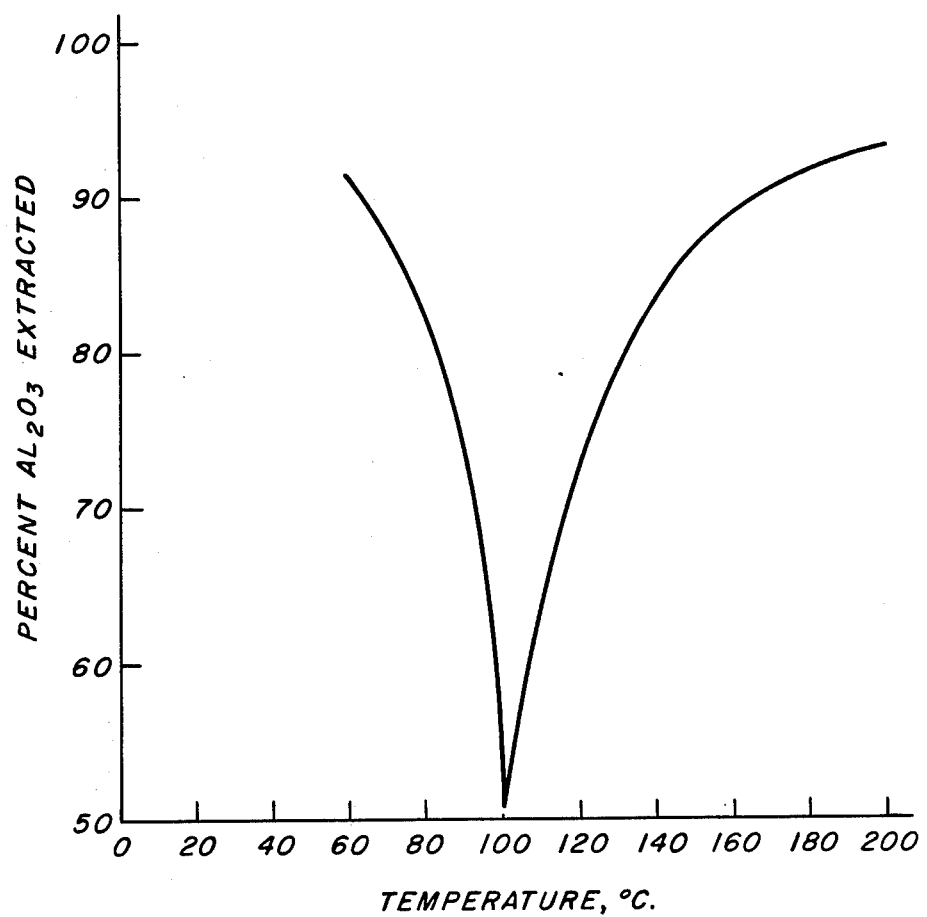
FIG. 2 is a graphical representation showing the effect of temperature on the back reaction of dissolved alumina with residue in a slurry from the digester.

Alternatively, the effluent may be cooled to a temperature below about 80° C because, as can be seen in FIG. 2, the losses of alumina due to the back reaction tend to lessen with decreasing temperatures below about 100° C. This mode, however, is not economically preferred because of the added cost of cooling the effluent.

In either temperature mode, it is important to effect the separation as quickly as possible. This separation time period can be defined as the time from which the effluent is cooled below 200° C until the dissolved alumina and the residue are no longer in contact. While there will be practical limitations on the minimum time period between the initial cooling until complete separation, the time period should not exceed 60 minutes and preferably as the temperature is lowered toward 120° C it should be even shortened down to the feasible minimum of about 1 minute. Thus, the term "quick separation" can be defined as meaning not greater than about 60 minutes and preferably not more than 10–20 minutes. It should be noted that this time period includes holding time in flash tanks, pumping time, etc. Actual separation in a centrifuge can be accomplished in as short as 8–15 seconds.

It should be further noted here that the need for quick separation coupled with the economics of a continuous digest virtually dictates the use of a centrifugal type device in preference to filtering devices. However, filters may be used if the total contact time between dissolved alumina and residue does not exceed the specified time periods.

The foregoing aspects of the invention involving control of the particle size in the digest and separation conditions of the alumina in solution from the residue have been found sufficient to provide a greatly improved yield. However, in some instances it has been found that the yield may be further improved by control of the concentration of the effluent from Digest I - particularly if, for some reason, separation is not carried out as rapidly as previously discussed.

In such instances, the back reaction rate may be slowed in accordance with one aspect of the invention by diluting the effluent with spent Bayer liquor. Spent Bayer liquor recycled via line 80 back to separation zone 22 has an aluminum oxide or alumina ($Al_2O_3$) concentration of about 40-60 grams/liter and sodium oxide or soda ($Na_2O$) concentration of about 90-110 grams/liter. This liquor is used to dilute the slurry from Digest I to reduce the back reaction of dissolved alumina in the Digest I effluent with the residue. The slurry from Digest I has an initial $Al_2O_3$ concentration of about 60-80 grams/liter and an initial $Na_2O$ concentration of about 425-475 grams/liter. The concentrations of soda and alumina in the slurry prior to dilution have been increased to 72-96 grams/liter and 540-575 grams/liter, respectively, by the withdrawal of vapor in that recovery stage. This dilution of effluent or slurry according to the invention also helps to maintain the desired process soda balance as well as inhibiting the back reaction of alumina out of solution.

Surprisingly, we have found that by this addition of spent Bayer liquor to the slurry of effluent from Digest I, we obtain better results than by recycling the spent Bayer liquor directly to crystallizer 28 where sodium aluminate is removed from the effluent from Digest I. As stated above, this addition of Bayer spent liquor to the Digest I effluent results in a reduction in total $Na_2O$ concentration thereby reducing the aforementioned rate of back reaction between Digest I solution and residue. A further effect is a reduction of the viscosity of the Digest I solution, which improves subsequent centrifugation thus aiding in more rapid separation.

While we prefer to dilute the effluent from Digest I with the Bayer spent liquor as illustrated in the flowsheet, any stream having a lower soda content than that of the Digest I effluent may be used. Preferably, it should have an alumina to soda ratio at least as high as the alumina/soda ratio in the Digest I effluent.

The following example using the caustic-lime digest for recovery of alumina from high silica ore is illustrative of the invention:

EXAMPLE I

Digest I — Ore Digest 200 grams of anorthosite ground to a particle size range of 100% by weight −65 mesh to 80% by weight +325 mesh were digested in a caustic solution having a concentration of 450 Kg of $Na_2O$ per meter$^3$ at 250° C for 30 minutes, lime being added in the amount of 1.1 moles CaO per mole of $SiO_2$.

SEPARATION OF DIGEST SLURRY

The slurry was then blown down from digest pressure to atmospheric pressure. The slurry was then centrifuged at about 120° C to separate the alumina liquor from the insoluble residue. The total elapsed time from blow-down to separation was about 3 minutes. Analysis of the residue following separation indicated that 95% of the alumina remained in solution.

SODIUM ALUMINATE CRYSTALLIZATION — DESILICATION

The green liquor from Digest I was mixed with the required amounts of recycle streams (Bayer spent liquor and crystal wash liquor), concentrated to about 575 Kg/m$^3$ $Na_2O$, seeded with 10-30 Kg of sodium aluminate crystals per m$^3$ of green liquor, cooled at a controlled rate to 40° C, and held at 40° C for several hours to achieve a maximum yield of sodium aluminate ($Na_2Al_2O_4 \cdot 2.5H_2O$). The $Al_2O_3$ concentration was reduced from 115 to 20 Kg/m$^3$, representing removal of 84% of the $Al_2O_3$ from the liquor. Vacuum filtration was used to deliquor the crystals. Entrained mother liquor was removed from the crystals with a controlled, displacement wash using liquor from subsequent alumina hydrate precipitation (which is referred to herein as Bayer spent liquor) and the crystals redissolved to make a liquor of similar concentration to Bayer green liquor. This liquor was desilicated by an atmospheric digest at 100° C for 60-90 minutes with additions of up to 12.5 Kg/m$^3$ DSP seed and up to 10 g/l $Ca(OH)_2$ for iron control. The desilication product (DSP) was removed by filtration and returned to Digest I to recover the $Al_2O_3$ and $Na_2O$. The clarified green liquor was cooled to approximately 65° C prior to precipitation of alumina hydrate. The liquor was seeded and held for the required retention time, as per conventional Bayer practice. The alumina hydrate was filtered, washed, and calcined to an alumina product. Fifty grams of alumina were recovered. Chemical analysis of the anorthosite indicated this represented 93% of the alumina in the anorthosite ore.

EXAMPLE II

To further illustrate the effect of particle size of the initial digestible material on the percentage of alumina extracted from the material, the Digest I-ore digest of Example I was repeated using a number of particle sizes. In each instance, the digest and separation of digest slurry were carried out under conditions identical to Example I. The results are tabulated below:

TABLE I

| Particle Diameter Range (in microns) | Percent $Al_2O_3$ Extraction |
|---|---|
| 1680–3360 | 27.2 |
| 840–1680 | 46.8 |
| 420–840 | 59.4 |
| 210–420 | 85.7 |
| 105–210 | 96.0 |
| 74–210* | 97.3 |
| 44–74* | 97.9 |
| less than 44 | 85.3 |

*Autogeneous grind

As can be readily seen, particles larger than 35 mesh (420 microns) provide an alumina extraction of less than 60% while particles within the preferred range of −65 mesh (210 microns) to +325 mesh (44 microns) provide an alumina extraction which exceeds 95%.

While the invention has been described in terms of preferred embodiments, the claim appended hereto are intended to encompass all embodiments which fall within the spirit of the invention.

Having thus described our invention and certain preferred embodiments thereof, we claim:

1. In a process for extraction of alumina from particulate aluminous material of high silica content by a digest with highly concentrated NaOH and lime to form a sodium-aluminate solution and an insoluble sodium-calcium-silicate residue, the improvement which comprises:
   a. digesting said material having a particle size distribution range of at least 80% by weight −35 to +325 mesh and at a temperature of at least 200° C; and
   b. separating said insoluble sodium-calcium-silicate residue at a temperature in the range of 120° to 200° C in a time period not exceeding 60 minutes.

2. The process of claim 1 wherein said particle size range is from −65 to +325 mesh.

3. The process of claim 1 wherein said separation temperature is the atmospheric boiling point of the effluent.

4. The process of claim 1 wherein said separation is made in a time period of from 1 to 20 minutes.

5. The process of claim 1 wherein the solution and residue from said digest are diluted with a stream having an $Na_2O$ content in the range of 90 to 110 grams per liter and having an alumina/$Na_2O$ ratio in the range of 0.36 to 0.66.

6. In a process for the extraction of alumina from alumina-containing siliceous materials by a digest with NaOH and lime to form a sodium-aluminate solution and an insoluble sodium-calcium-silicate residue, the improvement which comprises:
   a. grinding said materials to a particle size distribution of at least 80% by weight from −35 mesh to +325 mesh;
   b. digesting the ground material in said NaOH and lime at a temperature of at least 200° C to form a slurry of dissolved sodium aluminate and an insoluble calcium silicate residue;
   c. cooling said slurry to a temperature below 200° C but above 120° C;
   d. separating the residue from the liquid portion of the slurry in a time period of from 1 to 20 minutes while maintaining the temperature above 120° C; and
   e. recovering alumina from the liquid by subsequent precipitation.

7. The process of claim 6 wherein said alumina-containing material is anorthosite and separation is made at the boiling point of the slurry.

8. In a process for extraction of alumina from particulate aluminous material of high silica content by digest with highly concentrated NaOH and lime to form a sodium-aluminate solution and an insoluble sodium-calcium-silicate residue, the improvement which comprises:
   a. digesting material having a particle size distribution range of at least 80% by weight −35 to +325 mesh and at a temperature of at least 200° C; and
   b. separating said insoluble sodium-calcium-silicate residue at a temperature below about 80° C in a time period not exceeding 60 minutes.

* * * * *

UNITED STATES PATENT AND TRADEMARK OFFICE
CERTIFICATE OF CORRECTION

PATENT NO. : 4,044,095
DATED : August 23, 1977
INVENTOR(S) : Lawrence K. Hudson et al.

It is certified that error appears in the above-identified patent and that said Letters Patent are hereby corrected as shown below:

Col. 5, line 32           After "slurry", change "of" to --or--.

Signed and Sealed this

Twenty-ninth Day of November 1977

[SEAL]

Attest:

RUTH C. MASON
Attesting Officer

LUTRELLE F. PARKER
Acting Commissioner of Patents and Trademarks